US011474369B2

(12) United States Patent
Han et al.

(10) Patent No.: US 11,474,369 B2
(45) Date of Patent: Oct. 18, 2022

(54) LENS MOVING DEVICE, CAMERA MODULE AND OPTICAL APPARATUS

(71) Applicant: LG INNOTEK CO., LTD., Seoul (KR)

(72) Inventors: Jin Suk Han, Seoul (KR); In Jae Yeo, Seoul (KR); Jae Hong Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 128 days.

(21) Appl. No.: 16/904,974

(22) Filed: Jun. 18, 2020

(65) Prior Publication Data
US 2020/0319476 A1 Oct. 8, 2020

Related U.S. Application Data

(63) Continuation of application No. 16/405,511, filed on May 7, 2019, now Pat. No. 10,768,439, which is a
(Continued)

(30) Foreign Application Priority Data

Jun. 11, 2014 (KR) ........................ 10-2014-0070525

(51) Int. Cl.
G02B 27/64 (2006.01)
G02B 7/08 (2021.01)
(Continued)

(52) U.S. Cl.
CPC ............ G02B 27/646 (2013.01); G02B 7/08 (2013.01)

(58) Field of Classification Search
CPC ........ G02B 7/102; G02B 15/173; G02B 7/10; G02B 7/021; G02B 7/04; G02B 7/08; G03B 3/10; G03B 17/14; G11B 7/0932
(Continued)

(56) References Cited

U.S. PATENT DOCUMENTS 7,881,598 B1 2/2011 Wu et al.
9,720,251 B2 8/2017 Han et al.
(Continued)

FOREIGN PATENT DOCUMENTS

CN 102062926 A 5/2011
CN 102645815 A 8/2012
(Continued)

OTHER PUBLICATIONS

Office Action dated Apr. 6, 2018 in U.S. Appl. No. 15/654,317.
(Continued)

Primary Examiner — Dawayne Pinkney
(74) Attorney, Agent, or Firm — Saliwanchik, Lloyd & Eisenschenk

(57) ABSTRACT

A lens moving device is provided. The lens moving device includes: a bobbin; a first driving unit coupled to the bobbin; a second driving unit configured to move the first driving unit through an electromagnetic interaction with the first driving unit; a sensing magnet disposed on one side of the bobbin; a location detection sensor configured to sense a location of the sensing magnet; and a correction magnet disposed on an opposite side of the bobbin.

According to the present disclosure, static tilt and dynamic tilt of the bobbin, to which a lens module is to be coupled, may be enhanced by a sensing magnet and a correction magnet which establish magnetic force equilibrium with each other.

20 Claims, 5 Drawing Sheets

Related U.S. Application Data continuation of application No. 15/654,317, filed on Jul. 19, 2017, now Pat. No. 10,317,698, which is a continuation of application No. 14/729,475, filed on Jun. 3, 2015, now Pat. No. 9,720,251.

(51) Int. Cl.
 *G02B 7/02* (2021.01)
 *G02B 15/02* (2006.01)
 *G02B 15/14* (2006.01)

(58) Field of Classification Search
 USPC .............. 359/811–830, 642, 696, 694, 676, 359/699–701
 See application file for complete search history.

(56) References Cited

U.S. PATENT DOCUMENTS

| | | | |
|---|---|---|---|
| 10,317,698 B2 | 6/2019 | Han et al. | |
| 2006/0204242 A1 | 9/2006 | Guiterrez et al. | |
| 2007/0097532 A1 | 5/2007 | Kuo et al. | |
| 2009/0252488 A1 | 10/2009 | Eromaki et al. | |
| 2011/0103782 A1 | 5/2011 | Isuruta et al. | |
| 2011/0170204 A1* | 7/2011 | Park | H04N 5/2254 359/824 |
| 2011/0176046 A1 | 7/2011 | Hu et al. | |
| 2012/0154614 A1 | 6/2012 | Moriya et al. | |
| 2012/0229901 A1 | 9/2012 | Moriya et al. | |
| 2012/0314307 A1 | 12/2012 | Ikushima et al. | |
| 2013/0063615 A1 | 3/2013 | Takeuchi | |
| 2013/0107068 A1 | 5/2013 | Kim et al. | |
| 2013/0136438 A1 | 5/2013 | Lee et al. | |
| 2014/0072289 A1 | 3/2014 | Lim et al. | |
| 2015/0177479 A1* | 6/2015 | Lee | H02K 41/0356 359/824 |
| 2015/0309282 A1* | 10/2015 | Lee | G02B 27/646 359/814 |
| 2015/0331251 A1 | 11/2015 | Hu et al. | |
| 2016/0320585 A1* | 11/2016 | Park | H04N 5/23258 |

FOREIGN PATENT DOCUMENTS

| | | |
|---|---|---|
| CN | 102650723 A | 8/2012 |
| CN | 202512286 U | 10/2012 |
| CN | 102879972 A | 1/2013 |
| CN | 103238109 A | 8/2013 |
| CN | 103792640 A | 5/2014 |
| JP | 2011-118032 A | 6/2011 |
| KR | 10-2012-0007924 A | 1/2012 |

OTHER PUBLICATIONS

Office Action dated Sep. 19, 2019 in U.S. Appl. No. 16/405,511.
Notice of Allowance dated Mar. 18, 2020 in U.S. Appl. No. 16/405,511.
Office Action dated Jul. 28, 2022 in European Application No. 20 192 413.1.

* cited by examiner

LENS MOVING DEVICE, CAMERA MODULE AND OPTICAL APPARATUS

CROSS-REFERENCE TO RELATED APPLICATIONS

This application is a continuation of U.S. application Ser. No. 16/405,511, filed May 7, 2019; which is a continuation of U.S. application Ser. No. 15/654,317, filed Jul. 19, 2017, now U.S. Pat. No. 10,317,698, issued Jun. 11, 2019; which is a continuation of U.S. application Ser. No. 14/729,475, filed Jun. 3, 2015, now U.S. Pat. No. 9,720,251, issued Aug. 1, 2017; which claims the benefit under 35 U.S.C. § 119 of Korean Application No. 10-2014-0070525, filed Jun. 11, 2014; each of which is hereby incorporated by reference in its entirety.

BACKGROUND OF THE DISCLOSURE

Field of the Invention

The present disclosure relates to a lens moving device, a camera module, and an optical apparatus.

Background of the Related Art

A camera module may include an image sensor, a printed circuit board configured to deliver electric signals to the image installed on the printed circuit board, an infrared cut-off filter configured to block light in infrared area from incident into the image sensor, and an optical system including at least one lens configured to deliver an image to the image sensor. Here, a lens moving device configured to perform auto-focusing function and handshake compensation function may be installed in the optical system.

The lens moving device may be formed in a variety of ways. In general, a voice coil motor is commonly used in the lens moving device. The voice coil motor operates by an electromagnetic interaction between a magnet fixed in a housing and a coil unit wound on an outer circumferential surface of a bobbin coupled with a lens barrel. The voice coil motor may perform auto-focusing function. An actuator module of such voice coil motor may reciprocatively move in a direction parallel to an optical axis whereby a bobbin an up and down motion is elastically supported by an upper and a lower elastic member.

Recently, there has been a requirement to develop a lens moving device configured to detect an optimal focusing position by receiving a location information of a bobbin installed with a lens as a feedback. However, there is still a risk of performance degradation such as disequilibration of electromagnetic force, eccentricity of lens barrel due to magnetic force, etc.

BRIEF SUMMARY

According to an exemplary embodiment of the present disclosure, a lens driving device, a camera module and an optical apparatus, which are able to receive location information of a bobbin as a feedback, are provided.

In a general aspect of the present disclosure, there is provided a lens moving device comprising: a first lens driving unit, including a bobbin having at least one lens installed an inner side of the bobbin and a first coil installed on an outer circumferential surface of the bobbin and a holder member configured to support a magnet arranged at a periphery of the bobbin, and configured to move the bobbin and the first coil in a first direction parallel to an optical axis; a second lens driving unit configured to move the whole first lens driving unit in a second and a third direction different from each other and perpendicular to an optical axis, by an interaction between the magnet and a second coil; a circuit board including a base arranged by being spaced from the bobbin and the first lens driving unit at a predetermined interval, a support member configured to movably support the first lens driving unit so that the first lens driving unit can move in a second and a third direction with respect to the base and to supply electric power to the first coil, and a detection sensor configured to detect locations of a second coil arranged opposite to a magnet of the first lens driving unit and the second lens driving unit in a second and a third direction with respect to the base; a cover member; and a detection unit configured to detect a motion in a direction parallel to an optical axis of the bobbin, wherein the detection unit may include: a sensing magnet installed on an outer circumferential surface of the bobbin; and a location detection sensor on an inner side surface arranged on a side wall of the cover member and opposite to the sensing magnet, and wherein the bobbin may include: a correction magnet installed on a side opposite to a position where the sensing magnet is installed.

In some exemplary embodiments of the present disclosure, the cover member may be formed of a ferromagnetic substance.

In some exemplary embodiments of the present disclosure, the bobbin may be arranged at a position where the sensing magnet does not interfere with the coil unit.

In some exemplary embodiments of the present disclosure, the sensing magnet may be arranged at a position upper than the coil unit.

In some exemplary embodiments of the present disclosure, a virtual line connecting a center of the sensing magnet to a center of the correction magnet may pass through a center of the bobbin.

In some exemplary embodiments of the present disclosure, the sending magnet and the correction magnet may be arranged as not to face contact with the magnet.

In some exemplary embodiments of the present disclosure, the location detection sensor may be a Hall sensor.

In another general aspect of the present disclosure, there is provided a camera module comprising: an image sensor; a printed circuit board installed with the image sensor; and a first lens moving device formed as described in the above.

In still another general aspect of the present disclosure, there is provided a lens moving device comprising: a bobbin; a first driving unit coupled to the bobbin; a second driving unit configured to move the first driving unit through an electromagnetic interaction with the first driving unit; a sensing magnet disposed on one side of the bobbin; a location detection sensor configured to sense a location of the sensing magnet; and a correction magnet disposed on an opposite side of the bobbin.

In some exemplary embodiments of the present disclosure, the sensing magnet and the correction magnet may be spaced at a distance symmetrical to a center of the bobbin.

In some exemplary embodiments of the present disclosure, a center of the bobbin may be located on a virtual line connecting the sensing magnet and the correction magnet.

In some exemplary embodiments of the present disclosure, the sensing magnet and the correction magnet may have a shape and size symmetrical to each other.

In some exemplary embodiments of the present disclosure, the sensing magnet and the correction magnet may be disposed as to maintain a magnetic force equilibrium between each other.

In some exemplary embodiments of the present disclosure, the first driving unit and the sensing magnet may be disposed as being spaced in a direction corresponding to a direction of an optical axis of a lens module coupled to an inner side of the bobbin.

In some exemplary embodiments of the present disclosure, the lens moving device may further include: a holder member disposed at an outer side of the bobbin, the second driving unit coupled to the holder member; and an elastic member configured to elastically connect the bobbin and the holder member.

In some exemplary embodiments of the present disclosure, the elastic member may include: an upper elastic member configured to elastically connect an upper portion of the bobbin and an upper portion of the holder member; and a lower elastic member configured to elastically connect a lower portion of the bobbin and a lower portion of the holder member.

In some exemplary embodiments of the present disclosure, the second driving unit may be arranged at a corner portion formed whereby a first side surface and a second side surface of the holder member encounter with each other, and the sensing magnet may be disposed as being facing to the first side surface.

In some exemplary embodiments of the present disclosure, the bobbin may include: a first outer circumferential surface being facing to the first side surface; a second outer circumferential surface being facing to the second side surface; and a third outer circumferential surface being facing to the corner portion, wherein the sensing magnet is disposed on the first outer circumferential surface.

In some exemplary embodiments of the present disclosure, the location detection sensor may be inserted in a accommodation portion formed whereby a portion of an outer circumferential surface of the holder member is internally recessed.

In some exemplary embodiments of the present disclosure, the lens moving device may further include: a third driving unit configured to move the second driving unit through an electromagnetic interaction with the second driving unit; a base, the third driving unit coupled to the base; and a support member configured to elastically connect the holder member and the base.

In some exemplary embodiments of the present disclosure, the first driving unit may include a first coil, the second driving unit may include a magnet, and the third driving unit may include a second coil.

In some exemplary embodiments of the present disclosure, the bobbin may be movably supported, by the elastic member, in a direction corresponding to a direction of an optical axis of a lens module coupled to an inner side of the bobbin with respect to the holder member, and the holder member may be movably supported, by the support member, in a direction different from a direction of an optical axis of the lens module with respect to the base.

In some exemplary embodiments of the present disclosure, the support member may include four leaf springs.

In some exemplary embodiments of the present disclosure, the sensing magnet may include a pair of polarities (N,S) disposed on a surface opposite to the location detection sensor.

In still another general aspect of the present disclosure, there is provided a camera module comprising: a lens module; a bobbin, the lens module disposed on an inner side of the bobbin; a first driving unit coupled to the bobbin; a second driving unit configured to move the first driving unit through an electromagnetic interaction with the first driving unit; a sensing magnet disposed on a side of the bobbin; a location detection sensor configured to sense a location of the sensing magnet; and a correction magnet disposed on another side of the bobbin.

In some exemplary embodiments of the present disclosure, the camera module may further include: a controller configured to move the bobbin by applying electric power to the first driving unit, wherein the controller may control the electric power applied to the first driving unit by receiving a location of the sensing magnet sensed by the location detection sensor.

In still another general aspect of the present disclosure, there is provided an optical apparatus comprising: a main body; a display unit configured to display information, by being disposed on the main body; and a camera module configured to photograph a picture or motion picture, by being installed in the main body, wherein the camera module may include: a lens module; a bobbin, the lens module disposed on an inner side of the bobbin; a first driving unit coupled to the bobbin; a second driving unit configured to move the first driving unit through an electromagnetic interaction with the first driving unit; a sensing magnet disposed on a side of the bobbin; a location detection sensor configured to sense a location of the sensing magnet; and a correction magnet disposed on another side of the bobbin.

According to an exemplary embodiment of the present disclosure, a location of the bobbin during auto-focusing and handshake compensation operations may be accurately detected, because the location of the sensing magnet may be detected by the location detection sensor such as Hall sensor, by installing the sensing magnet on an outer side surface of the bobbin.

In addition, a tiling of the bobbin to a side of the cover member may be inhibited, because an attractive force formed between the sensing magnet attached on the bobbin and the cover member made of a metallic material may be offset by an attractive force formed between the correction magnet installed on a side opposite to the sensing magnet and the cover member.

DETAILED DESCRIPTION

Hereinafter, an exemplary embodiment of the present disclosure will be described with reference to the enclosed drawings.

Figure 1:
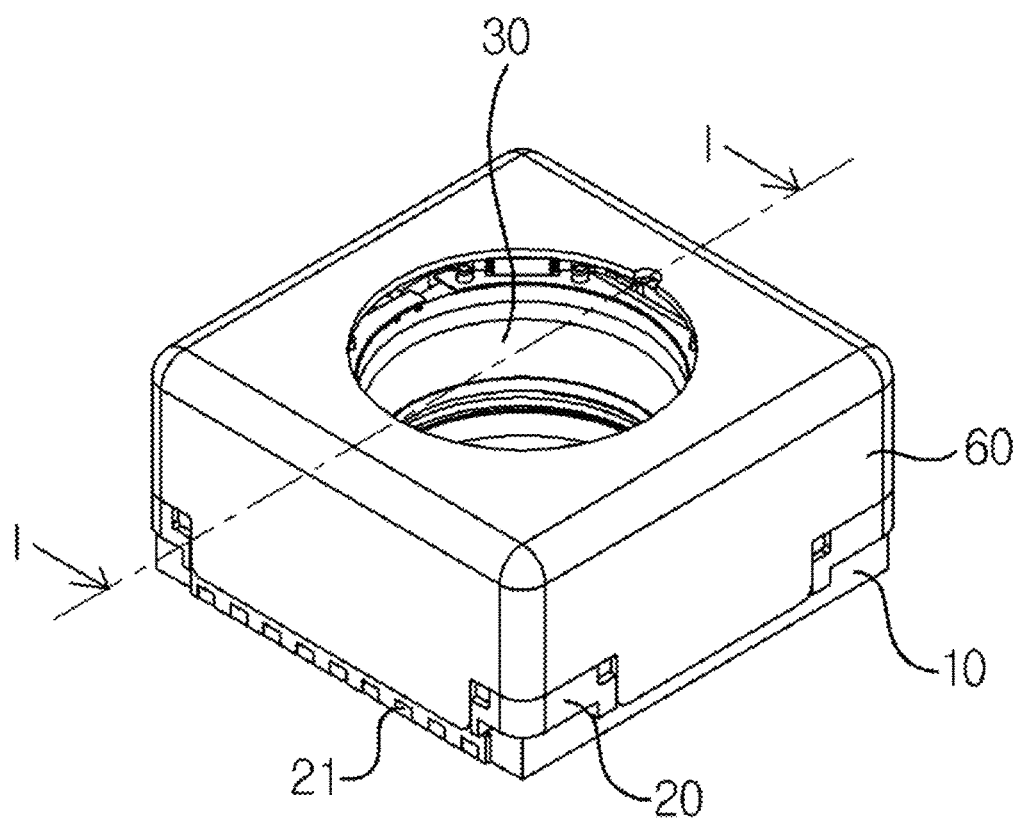
FIG. 1 is a schematic perspective view illustrating a camera module according to an exemplary embodiment of the present disclosure.
Figure 2:
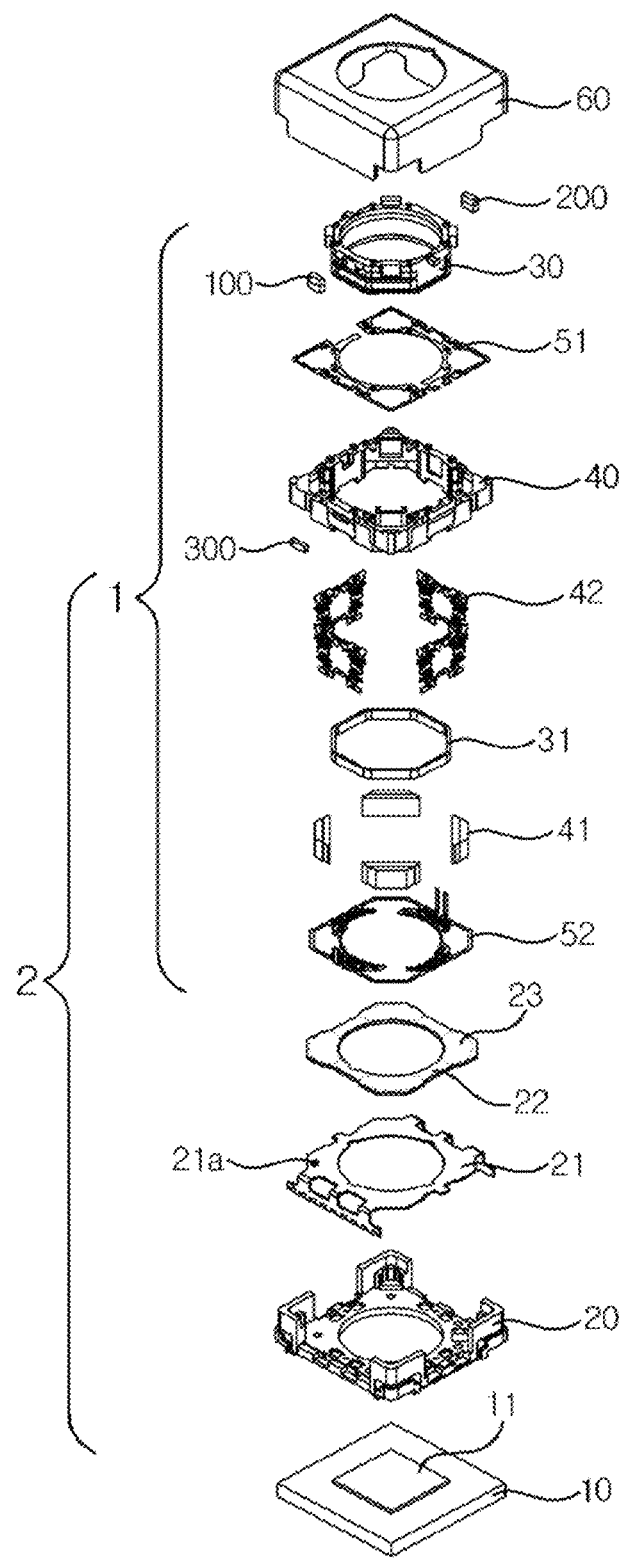
FIG. 2 is an exploded perspective view of FIG. 1.
Figure 3:
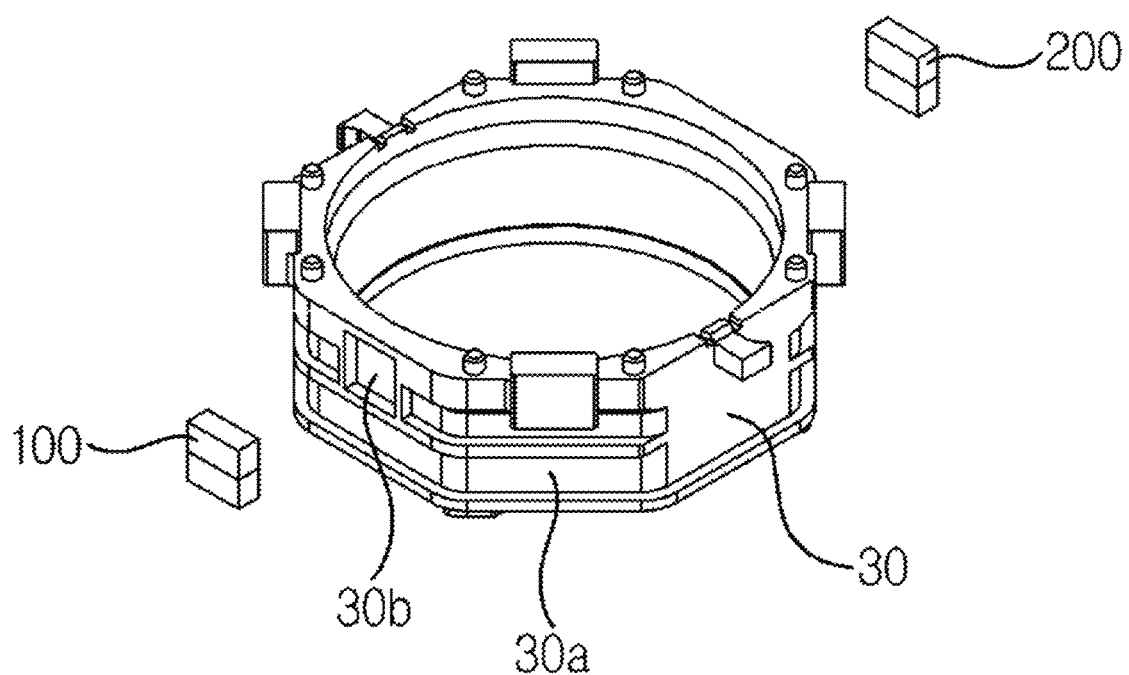
FIG. 3 is an enlarged perspective view illustrating a bobbin of FIG. 2.
Figure 4:
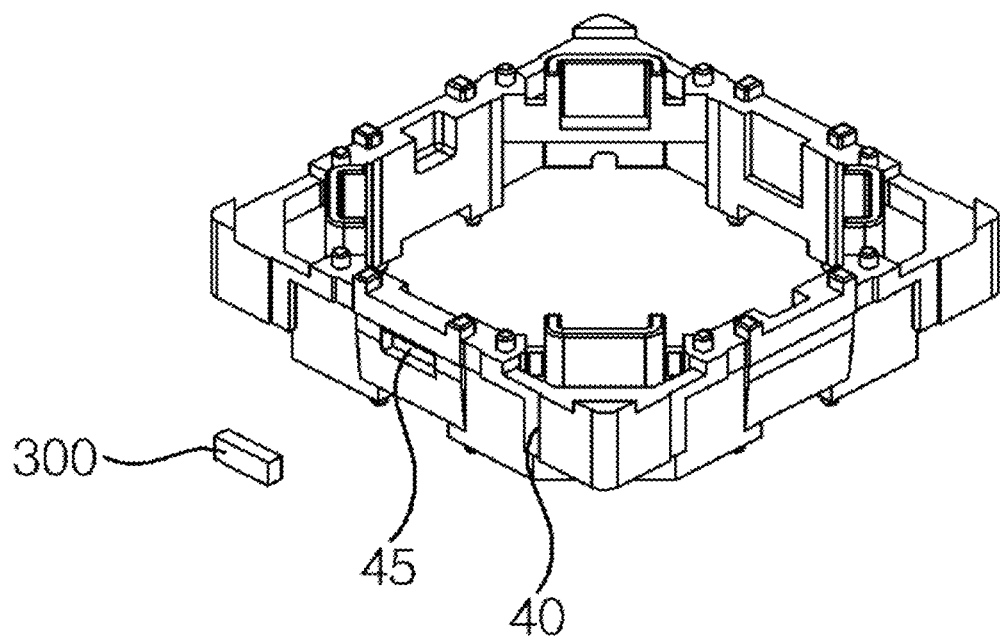
FIG. 4 is an enlarged perspective view illustrating a holder member of FIG. 2.
Figure 5:
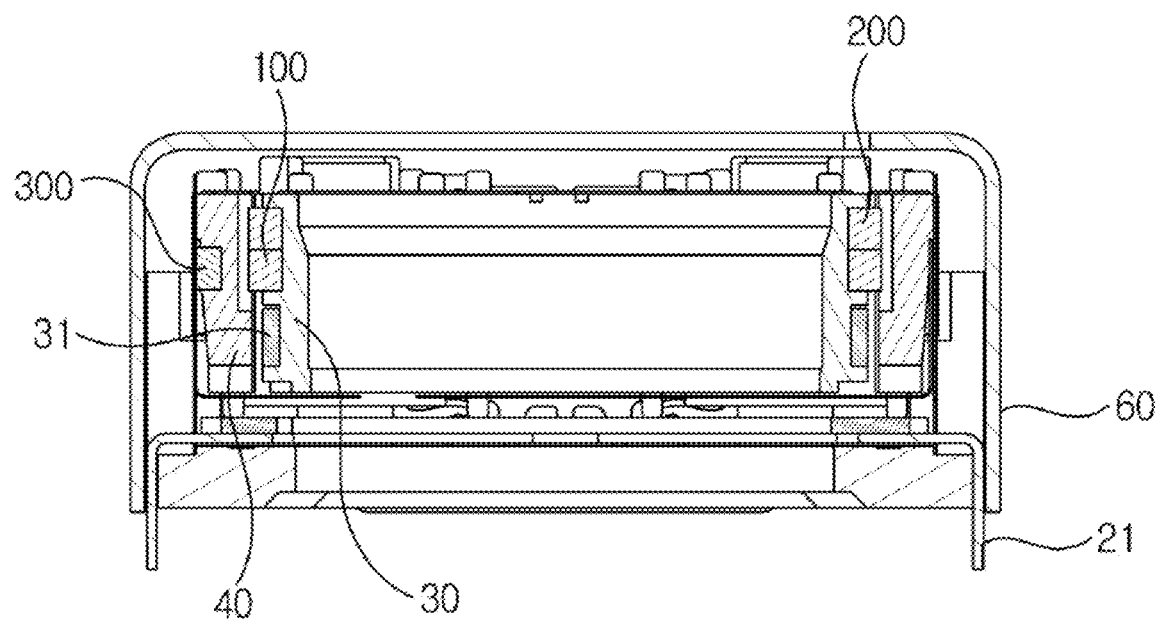
FIG. 5 is an I-I sectional view of FIG. 1.

FIG. 1 is a schematic perspective view illustrating a camera module according to an exemplary embodiment of the present disclosure; FIG. 2 is an exploded perspective view of FIG. 1; FIG. 3 is an enlarged perspective view illustrating a bobbin of FIG. 2; FIG. 4 is an enlarged perspective view illustrating a holder member of FIG. 2; and FIG. 5 is an I-I sectional view of FIG. 1.

As illustrated in FIGS. 1 and 2, a lens moving device according to an exemplary embodiment of the present disclosure may include a first lens driving unit (1) and a second lens driving unit (2). Here, the first lens driving unit (1) is a lens driving unit for auto-focusing function, and the second lens driving unit (2) is a lens driving unit for handshake compensation function.

Meanwhile, hereinafter, a first driving unit (31) may also refer to as a first coil (31), which is an example of the first driving unit (31), and vice versa. In addition, hereinafter, a second driving unit (41) may also refer to as a magnet (41), which is an example of the second driving unit (41), and vice versa. In addition, hereinafter, a third driving unit (23) may also refer to as a second coil (23), which is an example of the third driving unit (23), and vice versa.

The first lens driving unit (1) may include a base (20), a bobbin (30), a holder member (40) and a cover member (60). The cover member (60) may form an outer contour of the camera module. Otherwise, as illustrated in the drawings, a holder member (40) supporting the magnet (41) (to be described hereinafter) may be further arranged an inner side of the cover member (60).

The base (20) may be coupled to the cover member (60).

The bobbin (30) may be installed in an internal space of the cover member (60), as being reciprocatively movable in a direction of optical axis. A first coil (31) may be installed in a coil accommodation portion (30a) formed on an outer circumferential surface of the bobbin (30).

An upper (51) and a lower elastic member (52) may be installed on an upper portion and a lower portion of the bobbin (30), respectively. An end of the upper elastic member (51) may be connected to the bobbin (30), and another end of the upper elastic member (51) may be coupled to the holder member (40), but not limited hereto. The other end of the upper elastic member (51) may be coupled to the cover member (60), as circumstances requires. The other end of the upper elastic member (51) may be coupled to an upper surface or a lower surface of the holder member (40), when coupled to the holder member (40). An end of the lower elastic member (52) may be connected to the bobbin (30), and another end of the lower elastic member (51) may be coupled to an upper surface of the base, or may be coupled to a lower surface of the holder member (40). In addition, a protrusion may be formed on a lower side of the base (20) so as to couple the lower elastic member (52). A hole or recess may be formed on the lower elastic member (52), on a position corresponding to the position of the protrusion, so as to fix the lower elastic member by the coupling between the protrusion and the hole or recess. In addition, an adhesive may be additionally used for stronger coupling.

Meanwhile, as illustrated in FIG. 2, the upper elastic member (51) may be provided as two springs in a bi-divisional structure. The lower elastic member (52) may be formed a single body, so as to function as a socket for being applied with current. That is, the current applied through a terminal (not illustrated in the drawings) may be delivered through two springs of the upper elastic member (52), and the delivered current may be applied to the first coil (31) wound on the bobbin (30). To this end, the upper elastic member (51) and the first coil (31) may be conductively connected using a method such as soldering, respectively. That is, both distal ends of the two springs and the first coil (31) may be electrically connected using means such as soldering, Ag epoxy, welding, conductive epoxy, etc. However, the present disclosure is not limited hereto. Otherwise, in a reverse way, the lower elastic member (53) may be formed in a bi-divisional structure, and the upper elastic member (51) may be formed in a single body.

A bidirectional movement in a direction of an optical axis by the bobbin (30) may be supported by the upper and the lower elastic member (51, 52). That is, the bobbin (30) may be spaced from the base (20) at a predetermined distance so that the bobbin (30) can be controlled to move upward and downward with an initial position of the bobbin (30) as a center. In addition, the initial position of the bobbin (30) may be an upper surface of the base (20), so that bobbin (30) can be controlled to move only upward with an initial position of the bobbin (30) as a center.

Meanwhile, the first coil (31) may be provided as a coil block in a shape of ring, but not limited hereto. That is, the first coil (31) may be directly wound on an outer circumferential surface of the bobbin (30). As illustrated in FIG. 2, the first coil (31) may be installed at a position near to a lower surface of the bobbin (30), and may include a straight surface and a curved surface according to a shape of the bobbin (30).

In addition, the first coil (31) formed as a coil block may be in an angular shape, and may be in an octagonal shape. That is, the first coil (31) may be all formed of straight surfaces with no curved surface. This is by consideration of electromagnetic interaction with the magnet (41) disposed oppositely. That is, the electromagnetic force may be maximized when both surfaces of the magnet (41) and the first coil (31) opposing to each other are flat surfaces. However, the present disclosure is not limited hereto. The surfaces of the magnet (41) and the first coil (31) may be formed as all curved surfaces, all flat surfaces, or one as curved surfaces and the other as flat surfaces, according to its design specification.

In addition, the bobbin (30) may include a first surface flatly formed on a surface responding to the straight surface of the first coil (31) and a second surface roundly formed on a surface responding to the curved surface of the first coil (31), so that the first coil (31) can be coupled to an outer circumferential surface of the bobbin (30), but not limited. That is, the second surface may be also formed as a flat surface.

The holder member (40) may be formed as a frame roughly in a shape of hexahedron. Coupling structures for the upper and the lower elastic member (51, 52) to be coupled may be provide on an upper and a lower surface of the holder member (40), respectively. A magnet (41) may be installed at four edge portions of the holder member (40). Here, a accommodation portion (not illustrated in the drawings) may be formed at a position in which the magnet (41) is to be installed as illustrated in FIG. 2. However, the present disclosure is not limited hereto. That is, the magnet (41) may be adhesively fixed directly to an inner circumferential surface of the holder member (40). The magnet (41) may be fixed by bonding on a side surface or on an edge of the holder member (40), when the magnet (41) is directly fixed to the holder member (40) in such way as described in the above.

In addition, according to an exemplary embodiment of the present disclosure, the lens moving device may include only a cover member (60), without including a separate holder member (40). The cover member (60) may be formed of a metallic material which is a ferromagnetic substance such as iron. In addition, the cover member (60) may be provided in an angular shape when viewed from the above, so as to cover a whole of the bobbin (30). Here, the cover member (60) may be in a quadrilateral shape as illustrated in FIGS. 1 and 2. Otherwise, although it is not illustrated in the drawings, the cover member (60) may be provided in an octagonal shape. In addition, the magnetic field emitted from edges of the holder member (40) may be minimized, in case that the cover member is in an octagonal shape when viewed from the above and the magnet arranged at an edge of the holder member (40) is in a trapezoid shape when viewed from the above.

Meanwhile, the lens moving device according to an exemplary embodiment of the present disclosure may include a sensing unit for sensing motion of the bobbin (30).

The sensing unit may include a sensing magnet (100) and a first location detection sensor (300). Here, the first location detection sensor (300) may be installed on the holder member (40).

The sensing magnet (100) may be formed smaller and thinner than the magnet (41). As illustrated in the drawings, the sensing magnet (100) may be polarized into an upper and a lower portion, but not limited hereto. The sensing magnet (100) may be formed in a variety of shapes such as square, triangle, polygon, circle, etc.

Meanwhile, the second driving unit (41) may be arranged at a corner portion (40c) formed whereby a first side surface (40a) and a second side surface (40b) of the holder member (40) encounter with each other, and the sensing magnet (100) may be disposed as being opposite to the first side surface (40a). In addition, the bobbin (30) may include a first outer circumferential surface (30c) being opposite to the first side surface (40a), a second outer circumferential surface (30d) being opposite to the second side surface (40b), and a third outer circumferential surface (30e) being opposite to the corner portion (40c). Here, the sensing magnet (100) may be disposed on the first outer circumferential surface (30c). That is, the sensing magnet (100) may be disposed not opposite to the second driving unit (41). In other words, the sensing magnet (100) may be so arranged as to minimize magnetic force effect with respect to the second driving unit (41).

The sensing magnet (100) may be installed on an outer circumferential surface of the bobbin (30). According to an exemplary embodiment of the present disclosure, the sensing magnet (100) may be fixed in a sensing magnet reception area (30b) formed on the bobbin (30) using such as adhesive, glue, etc. Here, the sensing magnet reception area (30b) may be provided as a concave groove concavely formed on an outer circumferential surface of the bobbin (30), but not limited hereto. The sensing magnet reception area (30b) may be formed as a rib on a position where the sensing magnet (100) can be arranged.

A concave depth of the sensing magnet reception area (30b) may be formed responding to a thickness of the sensing magnet (100), or otherwise, may be formed lower of higher than the thickness of the sensing magnet (100). Therefore, the sensing magnet (100) may not be protruded out of the guide, when the sensing magnet (100) is fixed in the sensing magnet reception area (30b) using such as adhesive, glue, etc.

In addition, the sensing magnet (100) may be arranged at a position not interfering with the first coil (31). That is, when the first coil (31) is installed on a lower portion of the bobbin (30) as illustrated in FIG. 3, the sensing magnet (100) may be arranged on an upper portion of the bobbin (30), or vice versa. This is in order to so locate the first coil (31) as not to affect upward/downward movement of the bobbin (30) in a direction of optical axis. However, the sensing magnet (100) may also be arranged between the first coil (31) and the bobbin (30), or otherwise, may be arranged on an upper surface of the first coil (31) being opposite to the cover member (60) or the holder member (40).

The sensing magnet (100) may be so arranged as not to be opposite to the magnet (41), as illustrated in FIGS. 2 and 3. That is, the sensing magnet (100) may be so arranged as to face a side wall of the holder member (40), as not to be opposite to the magnet (41), because four of the magnets (41) may be respectively installed at internal edge portions of the holder member (40). The reason of such arrangement of the sensing magnet (100) as not to be opposite to the magnet (41) is, in order to inhibit interference between magnetic force change of the sensing magnet (100) and magnetic force of the magnet (41) and to enable the first location detection sensor to accurately feedback a motion of the bobbin (30). The sensing magnet (100) may be arranged on an upper portion or a lower portion of the magnet (41), as well as not being opposite to the magnet (41).

In addition, the sensing magnet (100) may be polarized into an upper and a lower portion. Therefore, the first location detection sensor (300) may detect upward/downward movement of the sensing magnet (100), so as to accurately detect upward/downward movement of the bobbin (30).

The first location detection sensor (300) may be conductively connected to the circuit board (21), and may output a location detection signal of the bobbin (30). However, the present disclosure is not limited hereto. A separate board may be arranged on a side wall of the holder member (40), and may be conductively connected with the first location detection sensor (300).

In addition, as illustrated in FIG. 4, the first location detection sensor (300) may be inserted in a location detection sensor accommodation portion (45) formed on an outer circumferential surface of the holder member (40). Here, an internal side of the side wall where the accommodation portion (45) is formed may form a concave area, so that a thickness of the holder member (40) can become the thinnest part at the accommodation portion (45). According to such structure, the distance between the first location detection sensor (300) and the sensing magnet (100) may be minimized, so that movement of the bobbin (30) can be detected more accurately.

In addition, as illustrated in FIG. 2, a correction magnet (200) may be installed on a surface opposite to the surface on which the sensing magnet (100) is installed.

The correction magnet (200) may be installed on an outer circumferential surface of the bobbin (30). According to an exemplary embodiment of the present disclosure, the correction magnet (200) may be fixed in a correction magnet reception area (not illustrated in the drawings) provided on the bobbin (30) using such as adhesive. Here, the correction magnet reception area may be provided as a concave groove concavely formed on an outer circumferential surface of the bobbin (30), but not limited hereto. The correction magnet reception area may be formed as a rib on a position where the correction magnet (200) can be arranged. The correction magnet reception area may be provided in a same shape as that of the sensing magnet reception area described in the above. A concave depth of the correction magnet reception area may be formed responding to a thickness of the correction magnet (200), or otherwise, may be formed lower of higher than the thickness of the correction magnet (200). Therefore, the sensing magnet (100) may not be protruded out of the guide, when the correction magnet (200) is fixed in the correction magnet reception area using such as adhesive, glue, etc.

The sensing magnet (100) and the correction magnet (200) may be provided in the same size. In addition, a center of the sensing magnet (100) may be aligned with a center of the correction magnet (200). According to such structure, the attractive force generated among the sensing magnet (100), the correction magnet (200) and the cover member (60) may be offset with one another, so that the center of the bobbin (30) is not tilting by being attracted to the cover member (60) side. Therefore, the bobbin (30) may not tilt to the cover member (60) side and may be arranged near the center where the attractive force among the sensing magnet (100), the correction magnet (200) and the cover member (60) establish equilibrium. Thereby, the bobbin (30) may move in a direction of optical axis, with the center of the bobbin (30) aligned with the optical axis.

Meanwhile, an exemplary embodiment where the sensing magnet (100) and the correction magnet (200) are disposed as to be opposite to a flat straight surface of the cover member (60) is described in the above. However, the present disclosure is not limited hereto. For example, the sensing magnet (100) and the correction magnet (200) may be disposed as to be opposite to an edge of the cover member (60).

The first lens driving unit (1) may be formed as described in the above. Otherwise, the first lens driving unit (1) may be replaced with an optical system implementing another auto-focusing function than the structure described in the above. That is, the first lens driving unit (1) may be formed of an optical module using a single-lens moving actuator or an actuator of variable reactive index type, instead of using an auto-focusing actuator of voice coil motor type. That is, any kind of optical actuator which is able to perform auto-focusing function may be used in the first lens driving unit (1).

Meanwhile, the second lens driving unit (2) is a lens driving unit for handshake compensation function. The second lens driving unit (2) may include a first lens driving unit (1), a base (20), a support member (42), a first and a second circuit board (21, 22), a second coil (23) and a second location detection sensor (21a).

A control element to drive the lens moving device may be installed on the first circuit board (21). A second coil (23) in a pattern shape may be formed on the second circuit board (22). The first and the second circuit board (21, 22) may be conductively connected to each other. The second circuit board (22) may be arranged by being laminated on an upper side of the first circuit board (21). However, the present disclosure is not limited hereto. The second lens driving unit (2) may include only the first circuit board (21), omitting the second circuit board (22). In such case, the second coil (23) may be assembled on the first circuit board (21) as a separate component.

The second coil (23) may move by shifting the whole of the first lens driving unit (1) in a direction of a flat surface perpendicular to the optical axis, through an interaction with the magnet (41). As illustrated in FIG. 2, the second coil (23) may be formed on the second circuit board (22) by a pattern coil method. The second coil (23) may be arranged at each of edge portions of the second circuit board (22), as a position responding to a bottom surface of the magnet (41).

As illustrated in FIG. 2, the second location detection sensor (21a) may be installed on the first circuit board (21), but not limited hereto. The second location sensor (21a) may be arranged separately as an independent component, or otherwise, may be arranged on the second circuit board (22). Here, the second location detection sensor (21a) may detect movement of the holder member (40) in which the magnet (41) is installed, in a direction perpendicular to the optical axis.

According to such exemplary embodiment of the present disclosure as described in the above, the time required for auto-focusing operation and handshake compensation may be reduced, because movement of the bobbin (30) in a direction of optical axis may be received as a feedback using the sensing magnet (100).

In addition, according to an exemplary embodiment of the present disclosure, the auto-focusing function may be performed more accurately and rapidly without risk of degradation of response characteristic, because the first coil (31) may operate while being wound on the bobbin (30), the sensing magnet (100) smaller than the magnet for auto-focusing function may be installed on the bobbin (30), and the first location detection sensor (300) may be arranged by adhering to a side wall of the lens moving device.

In particular, according to an exemplary embodiment of the present disclosure, the bobbin (30) may maintain a constant position with respect to the center of the cover member (60), because the correction magnet (200) having the same size and magnetic force as those of the sensing magnet (100) may be installed with their centers aligned on an opposite side of the bobbin (30), so that the bobbin (30) is not eccentric to the cover member (60) side.

Meanwhile, according to an exemplary embodiment of the present disclosure, the lens driving device having the sensing magnet (100) and the correction magnet (200) formed as illustrated in FIGS. 1 to 5 may be controlled in a single direction, and may also controlled bi-directionally. That is, the base (20) and the bobbin (30) may be arranged by adhering onto their initial position. For example, a stopper (25) may be form the initial position by being protruded on the base (20) side and contacting with a bottom surface of the bobbin (30). Otherwise, although it is not illustrated in the drawings, the stopper may be protruded on the bottom surface of the bobbin (30) and may be arranged by contacting with an upper surface of the base (20). In such case, a predetermined prepress may be applied to the upper and the lower elastic member (51, 52), so that the initial position of the bobbin (30) can adhere to the base (20). Thus, the bobbin (30) may move upward by the electromagnetic interaction, when electric power is applied. On the contrary, the bobbin (30) may return to the initial position by the restoring force of the upper and the lower elastic member (51, 52), when the electric power is shut off. Otherwise, the base (20) and the bobbin (30) may be arranged by being spaced from the initial position at a predetermined distance. In such case, the upper and lower elastic member (51, 52) may be formed in a flat shape with no prepress applied. Otherwise, the upper and lower elastic member (51, 52) may be formed with a predetermined prepress applied. In such case, the bobbin (30) may move upward or downward according to the polarity of current, when the electric power is applied in the initial state where the bobbin (30) is spaced from the base (20) at a predetermined distance. That is, the bobbin (30) may move upward with the initial position as a standard, when constant current is applied. In addition, the bobbin (30) may move downward with the initial position as a standard, when reverse current is applied.

As described in the above, according to an exemplary embodiment of the present disclosure, time required for auto-focusing operation may be minimized, because more accurate position of the bobbin (30) can be detected using the sensing magnet (100), when performing auto-focusing function by controlling the bobbin (30) to move upward or downward. In particular, the correction magnet (200) installed at a side opposite to the sensing magnet (100) may offset the attractive force between the sensing magnet (100) and the cover member (60), so that the bobbin (30) can move while keeping coaxial with the cover member (60) as far as possible.

The camera module may include a lens moving device formed as described in the above, a lens barrel (32) coupled to the bobbin (30), an image sensor (11) and a printed circuit board (10). Here, the image sensor (11) may be mounted on the printed circuit board (10). The printed circuit board (10) may be form a bottom surface of the camera module.

The bobbin (30) may include a lens barrel. At least one lens may be installed in the lens barrel. The lens barrel may be screw-coupled to an inside of the bobbin (30), but not limited hereto. The lens barrel may be fixed to an inside of the bobbin (30) by other means than the screw-coupling, or otherwise, one or more lenses may be integrally formed with the bobbin (30) as a single body. The lens may be formed of a single piece, or otherwise, may be formed of two or more lenses composing an optical system.

An infrared cut-off filter may be additionally installed at a position responding to the image sensor (11) on the base (20). The base (20) may be coupled to the holder member (40). In addition, the base (20) may support a lower side of the holder member (40). A separate terminal member may be installed on the base (20), in order for conductivity with the printed circuit board (10). The terminal may be integrally formed with the base (20) using such as surface electrodes. Meanwhile, the base (20) may function as a sensor holder to protect the image sensor (11). In such case, a protrusion may be formed in a downward direction along a side surface of the base (20). However, this is not an essential structure. Therefore, although it is not illustrated in the drawings, a separate sensor holder may be arranged at a lower portion of the base (20) and function as the sensor holder.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by the claims.

The invention claimed is:

1. A lens moving device comprising:
a base;
a holder member disposed on the base;
a bobbin disposed in the holder member;
a first coil disposed on the bobbin;
a first magnet disposed on the holder member;
a second coil disposed on the base;
a second magnet disposed on the bobbin; and
a sensor sensing the second magnet,
wherein the bobbin comprises a first groove formed on an outer lateral surface of the bobbin,
wherein the second magnet is disposed in the first groove of the bobbin,
wherein the first groove of the bobbin is recessed from the outer lateral surface of the bobbin by a first depth, and
wherein the first depth of the first groove is same as or greater than a thickness of the second magnet in a direction perpendicular to an optical axis direction.

2. The lens moving device of claim 1, wherein the second magnet does not protrude from the outer lateral surface of the bobbin;
wherein the first magnet is facing the first coil, and
wherein the second coil is disposed at a position corresponding to the first magnet.

3. The lens moving device of claim 1, wherein the bobbin comprises a second groove formed on the outer lateral surface of the bobbin, and
wherein at least a portion of the first coil is disposed in the second groove.

4. The lens moving device of claim 3, wherein the first coil does not protrude from the outer lateral surface of the bobbin.

5. The lens moving device of claim 1, wherein a portion of the bobbin comprises a rib shape and is disposed between the second magnet and the first coil.

6. The lens moving device of claim 1, wherein the sensor is disposed on an upper portion of the holder member,
wherein the sensor is disposed in an accommodation portion formed on the holder member whereby a portion of the holder member is recessed, and
wherein the sensor is configured to move together with the holder member when the holder member moves by an interaction between the second coil and the first magnet.

7. The lens moving device of claim 6, wherein the second magnet is disposed on an upper portion of the bobbin, and
wherein the first magnet is disposed on a lower portion of the holder member facing the first coil.

8. The lens moving device of claim 1, comprising:
a third magnet disposed on the bobbin and disposed opposite to the second magnet,
wherein the second magnet and the third magnet are disposed above the first coil and are overlapped with the first coil in the optical axis direction.

9. The lens moving device of claim 1, comprising:
an elastic member connecting the bobbin and the holder member;
a circuit board disposed on the base;
a support member elastically supporting the holder member with respect to the base; and
a cover member covering the holder member and coupled to the base,
wherein the second coil is disposed on the circuit board.

10. The lens moving device of claim 8, wherein the second magnet and the third magnet are spaced at a distance symmetrical to a center of the bobbin,
wherein a center of the bobbin is located on a virtual line connecting the second magnet and the third magnet,
wherein the second magnet and the third magnet have a shape and size symmetrical to each other, and
wherein the second magnet and the third magnet are disposed as to maintain a magnetic force equilibrium between each other.

11. The lens moving device of claim 3, wherein the second groove of the bobbin is formed between a first rib and a second rib disposed below the first rib,
wherein the first coil is disposed between the first rib and the second rib of the bobbin, and
wherein the first rib is disposed between the second magnet and the first coil.

12. The lens moving device of claim 3, wherein a depth of the second groove of the bobbin is same as the depth of the first groove of the bobbin.

13. The lens moving device of claim 1, wherein the second magnet is disposed at a position corresponding to a corner area of the holder member.

14. A camera module comprising:
a printed circuit board;
an image sensor disposed on the printed circuit board;
the lens moving device of claim 1 disposed above the printed circuit board; and
a lens coupled to the bobbin of the lens moving device.

15. An optical apparatus comprising:
a body;
the camera module of claim 14 disposed on the body and configured to photograph a picture; and
a display disposed on the body and configured to display the picture photographed by the camera module.

16. A lens moving device comprising:
a base;
a holder member disposed on the base;
a bobbin disposed in the holder member;
a first coil disposed on the bobbin;
a first magnet disposed on the holder member;
a second coil disposed on the base;
a second magnet disposed on the bobbin; and
a sensor sensing the second magnet,
wherein the bobbin comprises a first groove recessed from an outer lateral surface of the bobbin,
wherein the second magnet is disposed in the first groove of the bobbin, and
wherein the second magnet does not protrude from the outer lateral surface of the bobbin.

17. The lens moving device of claim 16, wherein the bobbin comprises a second groove formed on the outer lateral surface of the bobbin, and
wherein at least a portion of the first coil is disposed in the second groove.

18. The lens moving device of claim 17, wherein the first coil does not protrude from the outer lateral surface of the bobbin.

19. The lens moving device of claim 16, wherein the second magnet is overlapped with the first coil in an optical axis direction, and
wherein the first magnet is overlapped with the first coil in a direction perpendicular to the optical axis direction and is overlapped with the second coil in the optical axis direction.

20. A lens moving device comprising:
a base;
a holder member disposed on the base;
a bobbin disposed in the holder member;
a first coil disposed on the bobbin;
a first magnet disposed on the holder member;
a second coil disposed on the base;
a second magnet disposed on the bobbin; and
a sensor sensing the second magnet,
wherein the bobbin comprises a recess formed in an outer lateral surface of the bobbin,
wherein the second magnet is disposed in the recess of the bobbin,
wherein the second magnet is disposed between the first coil and a top surface of the bobbin,
wherein the first magnet is overlapped with the first coil in a first direction perpendicular to an optical axis direction and is overlapped with the second coil in the optical axis direction,
wherein the second magnet is not overlapped with the first coil in a second direction perpendicular to the optical axis direction, and
wherein a depth of the recess is same as or greater than a thickness of the second magnet in the second direction.

* * * * *